(12) United States Patent
Bublitz

(10) Patent No.: US 8,852,776 B2
(45) Date of Patent: Oct. 7, 2014

(54) BATTERY CONNECTION FOR A POWER TOOL

(75) Inventor: Scott D. Bublitz, Hartland, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 1034 days.

(21) Appl. No.: 12/369,077

(22) Filed: Feb. 11, 2009

(65) Prior Publication Data

US 2009/0202894 A1    Aug. 13, 2009

Related U.S. Application Data

(60) Provisional application No. 61/027,734, filed on Feb. 11, 2008.

(51) Int. Cl.
*H01M 2/10* (2006.01)
*B23B 23/02* (2006.01)

(52) U.S. Cl.
CPC .............. *H01M 2/1066* (2013.01); *Y02E 60/12* (2013.01)
USPC .............................................. 429/99; 173/217

(58) Field of Classification Search
USPC .......................................................... 429/99
See application file for complete search history.

(56) References Cited

U.S. PATENT DOCUMENTS

| | | |
|---|---|---|
| 3,999,110 A | 12/1976 | Ramstrom et al. |
| 4,597,227 A * | 7/1986 | Gentischer et al. ............ 451/342 |
| 4,625,462 A | 12/1986 | Fushiya et al. |
| D295,824 S * | 5/1988 | Hoshino et al. .................. D8/62 |
| D347,153 S | 5/1994 | Uneyama |
| D351,772 S | 10/1994 | Price |
| 6,057,608 A | 5/2000 | Bailey, Jr. et al. |
| 6,304,058 B2 | 10/2001 | Watson et al. |
| 6,329,788 B1 | 12/2001 | Bailey, Jr. et al. |
| 6,515,451 B2 | 2/2003 | Watson et al. |
| 6,562,509 B1 | 5/2003 | Eggert |
| 6,568,089 B1 | 5/2003 | Popik et al. |

(Continued)

FOREIGN PATENT DOCUMENTS

| | | |
|---|---|---|
| EP | 1973181 | 9/2008 |
| JP | 2001143678 | 5/2001 |

(Continued)

OTHER PUBLICATIONS

GB0902229.4 Search Report, 2 pages, Dated Apr. 15, 2009.

(Continued)

*Primary Examiner* — Barbara Gilliam
*Assistant Examiner* — Steven Scully
(74) *Attorney, Agent, or Firm* — Michael Best & Friedrich LLP

(57) ABSTRACT

A power tool includes a housing configured to house a motor. The housing defines a body axis and has a hand grip for a user, wherein the hand grip is positioned between a first end and a second end of the housing. The power tool further includes a tool element positioned at the first end of the housing and a battery connection port adapted to receive a battery pack. The battery connection port defines a removal axis for the battery pack and includes a first portion located at one end of the removal axis and a second portion located at an other end of the removal axis opposite the first portion. The second portion is positioned closer to the tool end than the first portion.

22 Claims, 3 Drawing Sheets

(56) References Cited

U.S. PATENT DOCUMENTS

| | | |
|---|---|---|
| 6,653,815 B2 | 11/2003 | Watson et al. |
| 6,913,087 B1 | 7/2005 | Brotto et al. |
| 6,921,285 B2 * | 7/2005 | Glauning ............... 439/500 |
| 6,935,438 B2 * | 8/2005 | Hofmann et al. ............ 173/217 |
| 6,983,809 B2 | 1/2006 | Leitenberger et al. |
| 6,996,909 B1 | 2/2006 | Buck et al. |
| 7,005,831 B2 | 2/2006 | Watson et al. |
| 7,063,171 B2 | 6/2006 | Totsu |
| D525,847 S | 8/2006 | Feldmann et al. |
| D527,966 S | 9/2006 | Hayakawa et al. |
| 7,248,019 B2 | 7/2007 | Ookubo et al. |
| 7,291,061 B2 | 11/2007 | Kiss |
| 7,291,062 B2 | 11/2007 | Kiss et al. |
| 2003/0102844 A1 | 6/2003 | Bailey |
| 2004/0088817 A1 | 5/2004 | Cochran et al. |
| 2005/0073282 A1 | 4/2005 | Carrier et al. |
| 2005/0077878 A1 | 4/2005 | Carrier et al. |
| 2006/0071643 A1 | 4/2006 | Carrier et al. |
| 2006/0108981 A1 | 5/2006 | Watson et al. |
| 2006/0151189 A1 | 7/2006 | Wu |
| 2006/0220605 A1 | 10/2006 | Funabashi et al. |
| 2006/0220612 A1 | 10/2006 | Feldmann et al. |
| 2007/0193761 A1 | 8/2007 | Brotto |
| 2007/0240892 A1 | 10/2007 | Brotto et al. |
| 2008/0284373 A1 | 11/2008 | Watson et al. |

FOREIGN PATENT DOCUMENTS

| | | |
|---|---|---|
| JP | 2001351592 | 12/2001 |
| JP | 2002260619 | 9/2002 |
| WO | WO2006/052825 * 5/2006 ............. B23D 49/16 |

OTHER PUBLICATIONS

Panasonic EY4640X RevoLithium 14.4 Volt Li-ion Angle Grinder (Bare Tool), Available Online at: <http://www.toolbarn.com/product/panasonic/EY4640X/>, Available at least as early as Dec. 8, 2008.

Ryobi One+ 4.5" Angle Grinder, Model P420, Available Online at: <http://www.homedepot.com/webapp/wcs/stores/servlet/ProductDisplay?storeId=10051&langId=-1&catalogId=10053&productId=100519983&N=10000003+90401+527282>, Available at least as early as Feb. 8, 2008.

Makita 18V LXT Lithium-Ion Cordless 4-1/2" Cut-Off/Angle Grinder (Tool Only), Model BGA452Z, Available Online at: <http://www.homedepot.com/webapp/wcs/stores/servlet/ProductDisplay?storeId=10051&langId=-1&catalogId=10053&productId=100487082&N=10000003+90401+527282>, Available at least as early as Feb. 8, 2008.

Battery Angle Grinder V28 AG, Milwaukee Electric Tools, Available Online at: <http://www.milwaukee-et.com/int/int_products.nsf/vwToolsLink/25BCBD1FBC7A18B2C12575AF00671BF7?OpenDocument&nav1=pro>, Available at least as early as Mar. 1, 2007.

GWS 14,4 V Professional, Bosch Elektrowerkzeuge—Akkuwinkelschleifer GWS 14,4 V, Available Online at: <http://www.bosch-pt.de/boptocs2-de/Product.jsp?country=DE&lang=de&division=gw&ccat_id=101316&object_id=7418>, Available at least as early as Feb. 8, 2008.

* cited by examiner

BATTERY CONNECTION FOR A POWER TOOL

CROSS-REFERENCE TO RELATED APPLICATION

The present patent application claims priority to U.S. Provisional Patent Application Ser. No. 61/027,734, titled "BATTERY CONNECTION FOR A POWER TOOL," filed on Feb. 11, 2008 by Scott D. Bublitz, the entire contents of which is hereby incorporated by reference.

BACKGROUND

The present invention relates to power tools and battery packs, and, more particularly, to a power tool having an angled battery connection port for a battery pack.

The battery connection port of a battery-operated power tool may be located on the power tool in a variety of positions. However, the battery connection port for a battery-operated power tool is often in a location that can create cumbersome operation for a user. For example, when the battery pack is connected to the power tool, the location of the battery pack may make it inconvenient for a user to both use the power tool and simultaneously assess the state of charge of the battery pack. In still other power tools, the user may find that the battery pack location creates an obstacle to proper handling of the power tool. Accordingly, when designing the location of a battery pack on a power tool, certain considerations should be taken into account, such as the size of the battery pack, the size and type of power tool, and the position of the user during operation (i.e., where the user holds the power tool and how the user holds the power tool during operation).

SUMMARY

In one embodiment, the invention provides a power tool. The power tool includes a housing configured to house a motor. The housing defines a body axis and has a hand grip for a user, wherein the hand grip is positioned between a first end and a second end of the housing. The power tool further includes a tool element positioned at the first end of the housing and a battery connection port adapted to receive a battery pack. The battery connection port defines a removal axis for the battery pack and includes a first portion located at one end of the removal axis and a second portion located at an other end of the removal axis opposite the first portion. The second portion is positioned closer to the tool end than the first portion.

In another embodiment, the invention provides a battery-operated power tool. The battery-operated power tool includes a housing assembly configured to house a motor. The housing assembly defines a body axis and has a hand grip for a user, wherein the hand grip is positioned between a first end and a second end of the housing. The battery-operated power tool further includes a tool element positioned at the first end of the housing and a connection port adapted to receive a battery pack having a fuel gauge. The connection port includes an interface surface having a first portion and a second portion. The second portion is positioned closer to the first end than the first portion, and the first portion is positioned at an angle of less than ninety degrees measured from the body axis.

In another embodiment, the invention provides a battery-operated power tool. The battery-operated power tool includes a housing configured to house a motor. The housing defines a body axis and has a hand grip for a user. The hand grip is positioned between a first end and a second end of the housing. The battery-operated power tool further includes a side handle extending from the housing, a tool element positioned at the first end of the housing, and a connection port adapted to receive a battery pack. The connection port includes an interface surface having a first portion and a second portion. The second portion is positioned closer to the tool end than the first portion.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
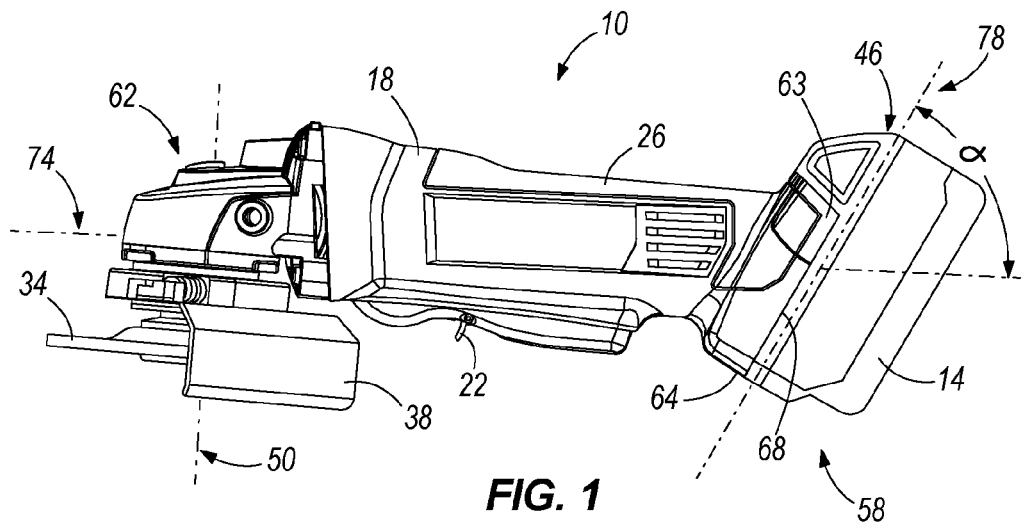
FIG. 1 is a side view of a power tool and battery pack according to one embodiment of the present invention.
Figure 2:
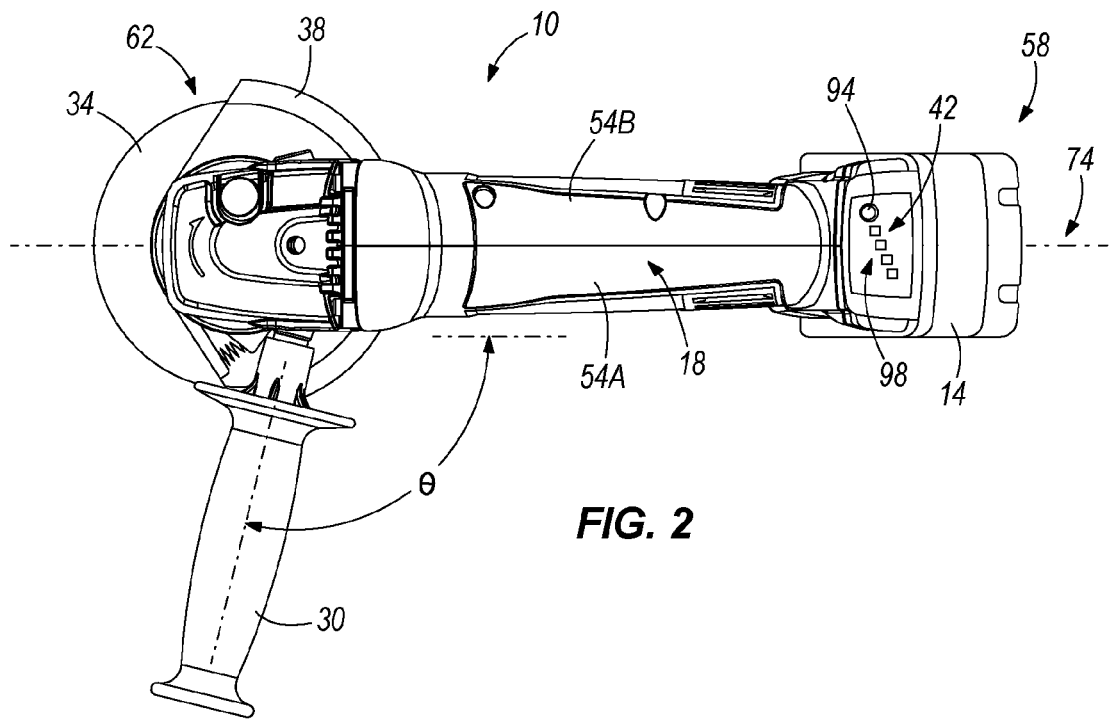
FIG. 2 is a top view of the power tool and battery pack shown in FIG. 1.

FIGS. 1-2 illustrate a power tool 10 including a battery pack 14. The power tool 10 is shown as a grinder. In other embodiments, the power tool may be another hand-held power tool, such as, for example, a reciprocating saw, a router, a drill, a screwdriver, a sander, a circular saw, a band saw, or other handheld power tool. The power tool 10 includes a housing assembly 18, an actuator 22, a hand grip 26, a side handle 30, a tool element or grinding blade 34, a guard 38, a fuel gauge 42, and a connection port 46 adapted to receive the battery pack 14.

The housing assembly 18 includes the main handle portion or hand grip 26 and the actuator 22. The actuator 22 is formed on a lower surface of the housing assembly 18 and extends outwardly from the housing assembly 18 for engagement by a user's finger or thumb. The actuator 22 is shown as a two-position lever; however, in other embodiments, the actuator may be a button, trigger, or other mechanism capable of actuation by a user. In other embodiments, the actuator has other orientations and locations.

The housing assembly 18 houses a drive mechanism, a motor, and a spindle. Together, the drive mechanism, the motor, and the spindle are operable to rotate the grinding blade 34 generally about a tool axis 50 for working on a workpiece. In other embodiments, the drive mechanism, the motor, and the spindle can also or alternatively reciprocate the tool element along the tool axis 50 for working on a workpiece. A guard 38 at least partially surrounds the grinding blade 34 to provide a guard or shield around the grinding blade 34. The guard 38 may be manufactured from plastic, metal, or other type of material capable of providing the guard function. The guard 38 is coupled to the drive mechanism.

As shown in FIG. 2, the side handle 30 extends from the power tool at an angle θ with respect to a body axis 74. The side handle 30 is configured to provide an additional hand grip for the user. The housing assembly 18 defines the body axis 74, which as shown, is substantially perpendicular with respect to the tool axis 50. The body axis 74 extends along the longitudinal length of the power tool. In the illustrated embodiment, the angle θ is greater than ninety degrees but less than 180 degrees. In other embodiments, the angle θ may be less than ninety degrees or greater than ninety degrees.

Figure 3:
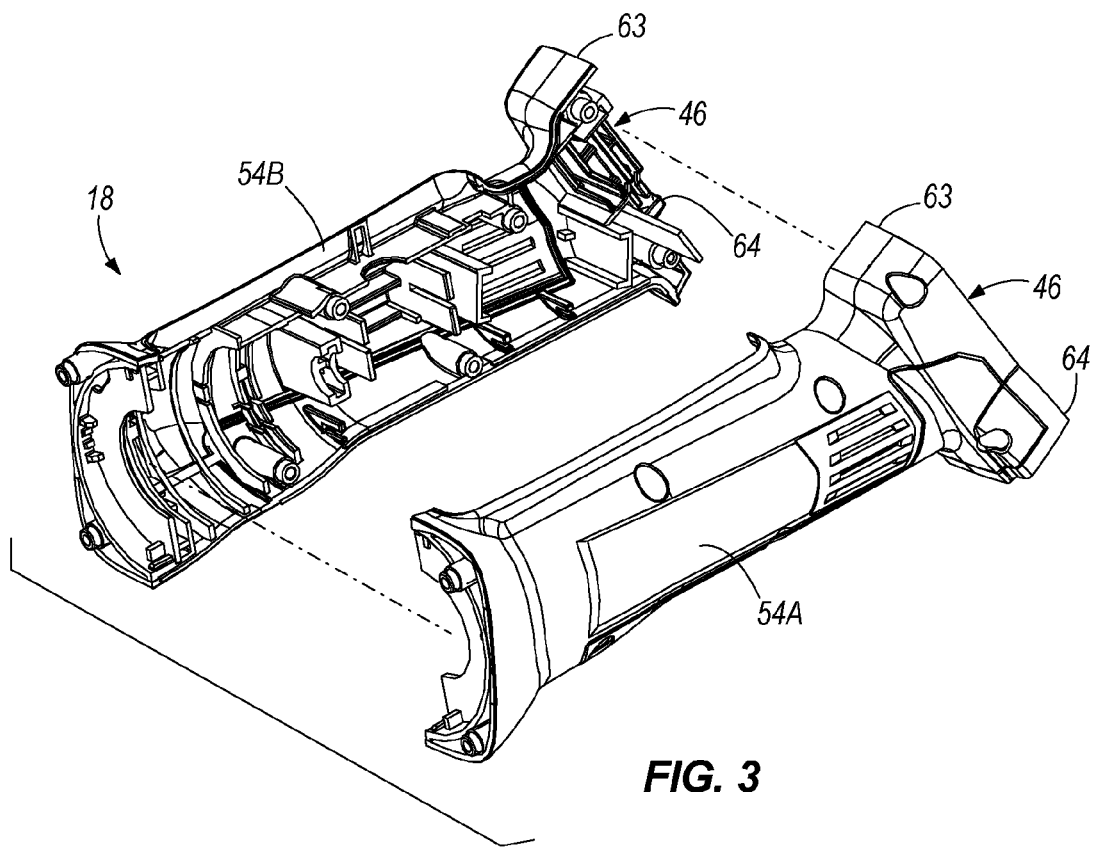
FIG. 3 is an exploded view of a portion of the housing assembly of the power tool of FIG. 1.
Figure 4:
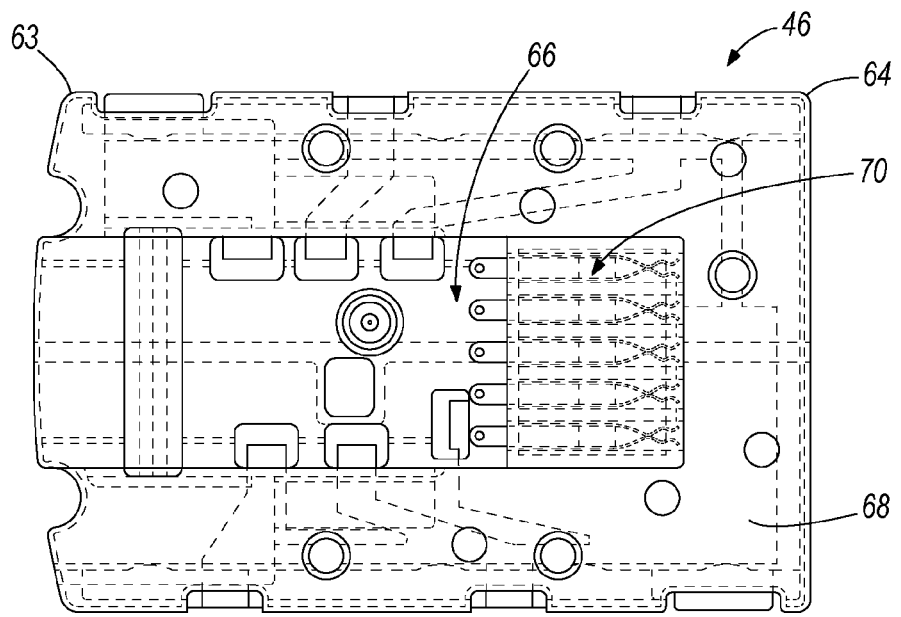
FIG. 4 is a view of the connecting configuration of the power tool of FIG. 1.

As shown in FIG. 3, the housing assembly 18 is formed from two halves 54A, 54B. The housing assembly 18 has a rear end 58 and a tool end 62. In other embodiments, the housing is formed as a single integral member, or alternatively, is formed from three or more interconnected members. At the rear end 58 of the power tool 10, the two halves of the housing assembly 54A, 54B come together to at least partially define a connecting port or connection mechanism 46 for removably supporting the battery pack 14 on the power tool 10. As shown in FIG. 4, the connecting port 46 includes a receiving portion having grooves 66 and projections 70. The grooves 66 and projections 70 are operable to engage a complementary connecting port 82 of the battery pack 14 (FIGS. 5 and 6).

The connecting port of the power tool also includes a terminal assembly positioned between forward ends of the grooves and projections and electrically connected to an electrical circuit, which extends through the power tool and is electrically connected to the motor. In other embodiments, the terminal assembly or a portion of the terminal assembly can be positioned in the projections.

As shown in FIG. 1, the connecting port 46 of the power tool 10 includes an interface surface 68 having an upper portion 63 and a lower portion 64. The interface surface 68 is sloped such that the lower portion 64 is positioned closer to the tool end 62 than the upper portion 63. Furthermore, the interface surface 68 is sloped with respect to the body axis 74 to define a removal axis 78. In the illustrated embodiment, the removal axis 78 is inclined such that the upper portion 63 is positioned at an acute angle a measured from the body axis 74. In the illustrated embodiment, angle a is approximately twenty-five (25) degrees. In other embodiments, the removal axis may be inclined at an angle that is greater than twenty-five degrees from the body axis but less than ninety degrees. In still other embodiments, the removal axis may be sloped at an angle a that is less than twenty-five degrees from the body axis. An angled removal axis provides a more streamlined tool configuration such that the battery pack does not interfere with the user during operation of the power tool.

Figure 5:
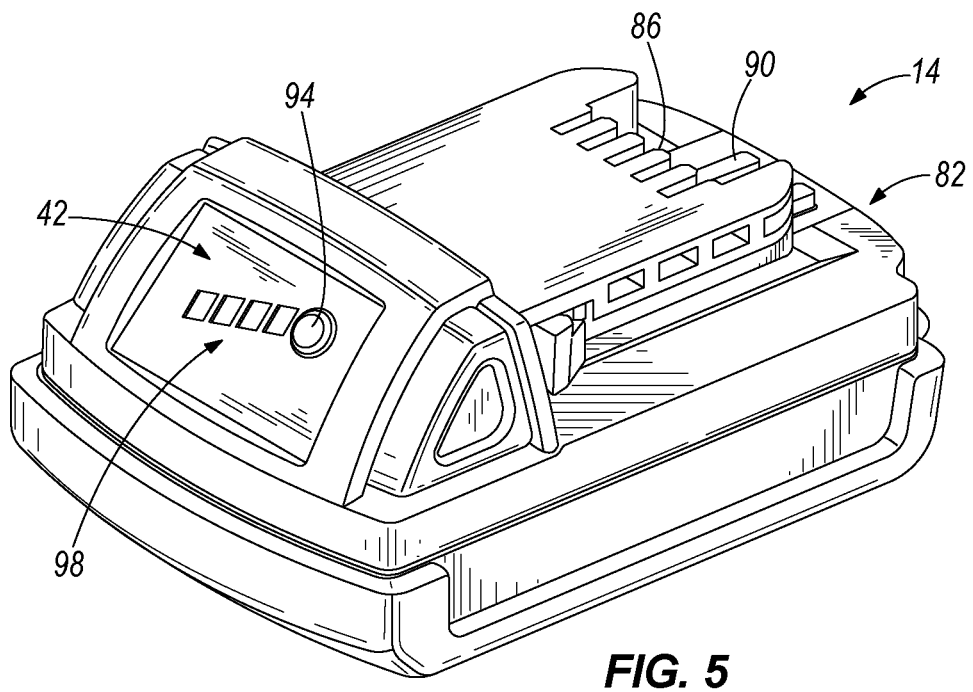
FIG. 5 is a front perspective view of one type of battery pack for use with the power tool.
Figure 6:
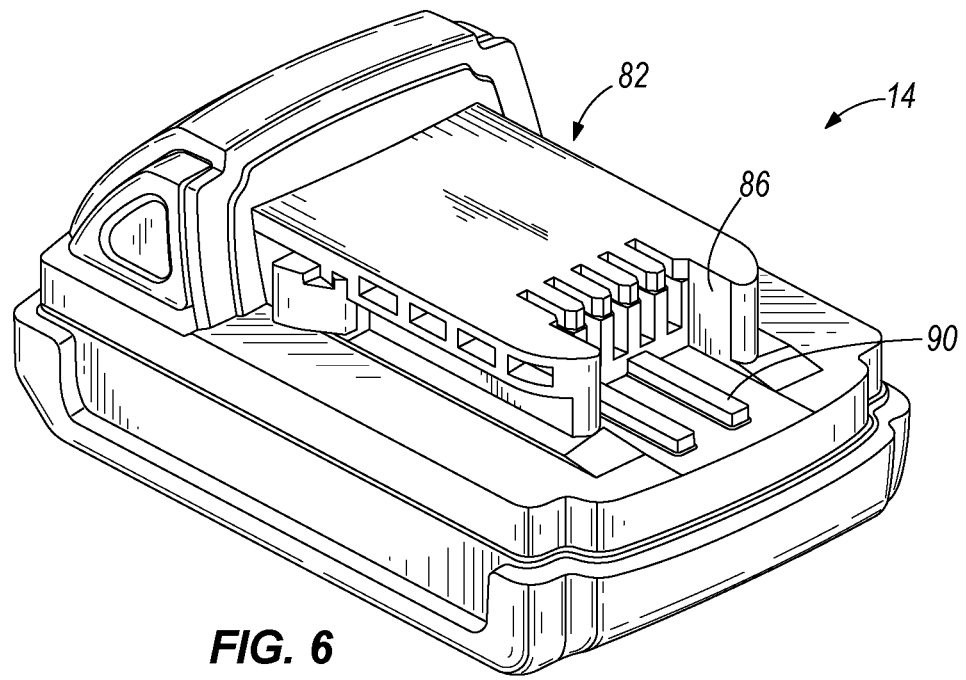
FIG. 6 is a rear perspective view of the battery pack of FIG. 3.

As shown in FIGS. 5-6, the connecting port 82 of the battery pack 14 includes outwardly extending guide rails 86 extending horizontally along an upper surface of the battery pack and protrusions 90 formed along and extending outwardly along exterior sides of the guide rails 86. The guide rails 86 and the protrusions 90 are operable to inter-engage with the grooves 66 and projections 70 on the connecting port 46 of the housing assembly 18 to removably support the battery pack 14 on the power tool 10. In other embodiments, the guide rails and the protrusions have other relative positions and orientations within the connecting port of the battery pack.

Although not shown, the connecting port may also include a terminal assembly, which is electrically connected to the terminal assembly of the power tool to supply electrical power to the electrical circuit of the power tool. In some embodiments, the terminal assembly is positioned on an upper surface of the battery pack between forward ends of the guide rails. In other embodiments, the terminal assembly or a portion of the terminal assembly is supported in the guide rails of the battery pack. In these embodiments, at least a portion of the terminal assembly of the power tool is supported in the projections of the power tool for engagement with the terminal assembly or the portion of the terminal assembly supported in the battery pack.

In the illustrated embodiment, a fuel gauge 42 provides a visual indication of the state of the charge of the battery pack 14. A microprocessor (not shown) enables the function of the fuel gauge 42. The fuel gauge 42 includes a push button 94 configured to be depressible by the user to activate the visual indication and a plurality of indicators 98. The indicators 98 are illustrated as a series of square-shaped lights that are alternately lit to indicate certain battery characteristics, such as, but not limited to, battery charge remaining or battery charge used. However, in other embodiments, the indicators can be any shape or configuration that will indicate a certain battery characteristic to the user.

In some constructions, the microprocessor enables the fuel gauge 42 whether or not the push button 94 is depressed during time periods when the battery pack 14 is active (e.g., during charging and/or discharging). In one construction, for example, the fuel gauge 42 is operational during charging. In this construction, the microprocessor automatically enables the fuel gauge 42 to display the current state of charge of the battery pack 14 continuously or periodically (e.g., after certain predetermined time intervals or during periods of low current draw/supply), in response to certain battery characteristics (e.g., when the current state of charge reaches certain defined thresholds, such as, every 5% increase in state of charge), or in response to certain stages, modes, or changes in the charge cycle. In other constructions, the microprocessor enables the fuel gauge 42 in response to the depression of the push button 94 when the battery pack 14 is active.

In some constructions and in some aspects, the fuel gauge 42 is enabled via a touch pad, a switch, or the like. In other constructions, the battery pack 14 includes another push button or switch (not shown) for enabling and disabling an automatic displaying mode. In these constructions, a user selects whether to have the circuit operate in an automatic displaying mode or operate in a manual displaying mode. The automatic displaying mode includes the fuel gauge 42 displaying the current state of charge of the battery pack 14 without user activation. For example, in the automatic displaying mode, the fuel gauge 42 displays the current state of charge of the battery pack 14 periodically (e.g., after certain predetermined time intervals), in response to certain battery characteristics (e.g., when the current state of charge reaches certain defined thresholds, such as, every 5% increase or decrease in state of charge), or the like. The manual displaying mode includes the fuel gauge 42 displaying the current state of charge in response to user activation, such as, for example, the depression of the push button 94. In some constructions, the push button 94 is disabled when the circuit is operating in the automatic displaying mode. In other constructions, the push button 94 still enables the fuel gauge 42 even when the circuit is operating in the automatic displaying mode. In further constructions, the automatic displaying mode is enabled and disabled via the push button 94, a control signal from an electrical device, such as, for example, a power tool 10 or battery charger, or the like.

In operation, the battery pack 14 is aligned with the power tool 10 along the removal axis 78 such that the guide rails 86 and the protrusions 90 of the battery pack 14 are aligned with the projections 70 and grooves 66 of the power tool 10. The battery pack 14 is then moved rearwardly along the removal axis 78 to interconnect the guide rails 86 and the protrusions 90 of the battery pack 14 and the projections 70 and grooves 66 of the power tool 10. As the battery pack 14 is moved onto the connecting port 46 of the power tool 10, the terminal assembly of the power tool is electrically connected to the terminal assembly of the battery pack. To remove the battery pack 14 from the power tool 10, the user grips the housing assembly 18 with one hand and the battery pack 14 with the second hand. The user can then slide the battery pack 14 along the guide rails 86 and away from the power tool 10.

When the battery pack 14 is coupled to the power tool 10 (FIGS. 1-2), the angled connecting port 46 increases visibility of the fuel gauge 42 to the user. With a non-angled connection port (i.e., when the battery pack is horizontal or perpendicular with respect to the body axis), the fuel gauge on the battery pack is difficult for the user to view without manipulation of the power tool. However, an angled connection port 46 allows the user to operate and view the fuel gauge 42 without having to otherwise manipulate the power tool 10 in order to view the fuel gauge 42.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A power tool comprising:
    a motor;
    a housing configured to house the motor, the housing defining a body axis and having a hand grip, wherein the hand grip and the motor are positioned between a first end and a second end of the housing and the body axis extends through the hand grip, the motor, and the first end and the second end of the housing;
    a tool element positioned at the first end of the housing, the tool element pivotable about a tool axis;
    an actuator adjacent the hand grip and configured to operate the motor to pivot the tool element about the tool axis;
    a battery pack; and
    a battery connection port positioned at the second end of the housing and adapted to receive the battery pack;
    wherein the battery connection port defines a removal axis for the battery pack,
    wherein the battery connection port includes a first portion located at one end of the removal axis and a second portion located at an other end of the removal axis opposite the first portion,
    wherein the second portion is positioned closer to the first end of the housing than the first portion such that the removal axis forms an angle less than ninety degrees with respect to the body axis,
    wherein the tool axis and the body axis lie in a common plane, the body axis dividing the plane into an upper portion and a lower portion, the lower portion intersecting the tool element and the upper portion intersecting the battery pack, and
    wherein the second portion of the battery connection port intersects the lower portion of the plane.

2. The power tool of claim 1 wherein the battery pack includes a fuel gauge that is readily visible to the user during operation of the power tool when the battery pack is coupled to the battery connection port.

3. The power tool of claim 2 wherein the fuel gauge includes a visual indication of a battery pack state.

4. The power tool of claim 2 the fuel gauge is positioned proximate the first portion of the battery connection port when the battery pack is coupled to the battery connection port.

5. The power tool of claim 1 wherein the removal axis forms an angle is approximately twenty-five degrees with respect to the body axis.

6. A battery-operated power tool comprising:
    a motor;
    a housing assembly configured to house the motor, the housing assembly defining a body axis and having a hand grip for a user, wherein the hand grip and the motor are positioned between a first end and a second end of the housing and the body axis extends through the hand grip, the motor, and the first end and the second end of the housing;
    a tool element positioned at the first end of the housing, the tool element defining a tool axis;
    a battery pack having a fuel gauge; and
    a connection port positioned at the second end of the housing and adapted to couple the battery pack to the housing,
    wherein the connection port includes an interface surface having a first portion and a second portion,
    wherein the second portion is positioned closer to the first end than the first portion,
    wherein the first portion defines a removal that is positioned at an angle of less than ninety degrees measured from the body axis,
    wherein the hand grip at least partially surrounds the motor and the hand grip is positioned between the removal axis and the tool axis
    wherein the tool axis and the body axis lie in a common plane, the body axis dividing the plane into an upper portion and a lower portion, the lower portion intersecting the tool element and the upper portion intersecting the battery pack, and
    wherein the second portion of the battery connection port intersects the lower portion of the plane.

7. The battery operated power tool of claim 6 wherein the fuel gauge is readily visible to the user during operation of the power tool when the battery pack is coupled to the connection port.

8. The battery-operated power tool of claim 6 wherein the fuel gauge includes a visual indication of a battery pack state.

9. The battery-operated power tool of claim 6 wherein the fuel gauge is positioned proximate the first portion of the connection port when the battery pack is coupled to the connection port.

10. The battery-operated power tool of claim 6 wherein the angle is approximately twenty-five degrees.

11. A battery-operated power tool comprising:
    a motor;
    a housing configured to house the motor, the housing defining a body axis and having a hand grip, wherein the hand grip and the motor are positioned between a first end and a second end of the housing and the body axis extends through the hand grip, the motor, and the first end and the second end of the housing;
    a side handle extending from the housing;
    a tool element positioned at the first end of the housing, the tool element pivotable about a tool axis;
    a battery pack; and
    a connection port adapted to couple the battery pack to the housing, wherein the connection port includes an interface surface having a first portion and a second portion, wherein the second portion is positioned closer to the first end of the housing than the first portion, wherein the tool axis and the body axis intersect wherein the tool axis and the body axis lie in a common plane, the body axis dividing the plane into an upper portion and a lower portion, the lower portion intersecting the tool element and the upper portion intersecting the battery pack, and wherein the second portion of the battery connection port intersects the lower portion of the plane.

12. The battery-operated power tool of claim 11 wherein the battery pack includes a fuel gauge that is readily visible to the user during operation of the power tool when the battery pack is coupled to the connection port.

13. The battery-operated power tool of claim 12 wherein the fuel gauge includes a visual indication of a battery pack state.

14. The battery-operated power tool of claim 12 wherein the fuel gauge is positioned proximate the first portion of the connection port when the battery pack is coupled to the connection port.

15. The battery-operated power tool of claim 11 wherein the connection port defines a removal axis for the battery pack, wherein the second portion of the interface surface is positioned closer to the first end housing than the first portion of the interface surface such that the removal axis is at an angle of less than ninety degrees measured from the body axis.

16. The battery-operated power tool of claim 15 wherein the angle is approximately twenty-five degrees.

17. The battery-operated power tool of claim 11 wherein the interface surface defines a removal axis slanted with respect to the body axis.

18. The power tool of claim 1 wherein the tool axis is disposed at an angle with respect to the body axis.

19. The power tool of claim 18 wherein the body axis is substanstially perpendicular with respect to the tool axis.

20. The power tool of claim 1 wherein the motor includes an output shaft rotatable about a motor axis, wherein the motor axis intersects the tool axis and the removal axis.

21. The power tool of claim 20 wherein the body axis is parallel to the motor axis.

22. The power tool of claim 1, wherein the hand grip surrounds the motor.

* * * * *